(12) United States Patent
Wang et al.

(10) Patent No.: US 9,724,897 B2
(45) Date of Patent: Aug. 8, 2017

(54) PROCESSING METHOD FOR CONSTRAINING LOWER MELTING POINT METALS WITHIN CERAMIC LAMINATES DURING SINTERING

(71) Applicant: EmiSense Technologies, LLC, Ladera Ranch, CA (US)

(72) Inventors: Gangqiang Wang, Salt Lake City, UT (US); Joseph Fitzpatrick, Glendale, CA (US); James John Steppan, Park City, UT (US); Leta Yar-Li Woo, Oakland, CA (US); Brett Tamatea Henderson, Salt Lake City, UT (US); Frank Bell, Sandy, UT (US)

(73) Assignee: EmiSense Technologies, LLC, Ladera Ranch, CA (US)

( * ) Notice: Subject to any disclaimer, the term of this patent is extended or adjusted under 35 U.S.C. 154(b) by 102 days.

(21) Appl. No.: 14/591,840

(22) Filed: Jan. 7, 2015

(65) Prior Publication Data

US 2016/0194252 A1 Jul. 7, 2016

(51) Int. Cl.
    *B32B 18/00* (2006.01)

(52) U.S. Cl.
    CPC ........ *B32B 18/00* (2013.01); *C04B 2237/348* (2013.01); *C04B 2237/565* (2013.01); *C04B 2237/568* (2013.01); *C04B 2237/68* (2013.01)

(58) Field of Classification Search
    None
    See application file for complete search history.

(56) References Cited

U.S. PATENT DOCUMENTS

| | | | |
|---|---|---|---|
| 6,964,733 B1 | 11/2005 | Schneider et al. | |
| 2004/0022043 A1* | 2/2004 | Sakai | H01L 23/49822 361/795 |
| 2004/0032208 A1* | 2/2004 | Wu | H05B 33/10 313/509 |
| 2007/0187137 A1* | 8/2007 | Isebo | H01L 23/15 174/255 |
| 2008/0135155 A1* | 6/2008 | Kawamura | H01L 21/4807 156/89.11 |
| 2011/0036622 A1* | 2/2011 | Chikagawa | B32B 18/00 174/257 |
| 2011/0284270 A1* | 11/2011 | Katsube | B32B 18/00 174/251 |
| 2013/0026636 A1* | 1/2013 | Tani | H01L 23/49822 257/762 |
| 2016/0358832 A1* | 12/2016 | Suzuki | H01L 21/4817 |

* cited by examiner

*Primary Examiner* — Andre Allen
(74) *Attorney, Agent, or Firm* — Kunzler Law Group

(57) ABSTRACT

A method is described. The method is a method for making a constraining ceramic assembly. The method includes applying at least one metallic electrode to a substrate. The method also includes applying a porous ceramic layer to the substrate to cover the metallic electrode. The method also includes sintering the substrate, the porous ceramic layer, and the metallic electrode together at a sintering temperature above a melting point of the metallic electrode.

18 Claims, 7 Drawing Sheets

PROCESSING METHOD FOR CONSTRAINING LOWER MELTING POINT METALS WITHIN CERAMIC LAMINATES DURING SINTERING

BACKGROUND

Ceramics are a desirable material in many applications. A conventional method for forming and manufacturing ceramics includes sintering. Sintering is a process in which sufficient heat is applied to the ceramic to provide mechanical strength and other material properties. For example, yttria-stabilized zirconia is a ceramic that is fully sintered at relatively high temperatures. This can be problematic when additional components are integrated with the ceramic prior to sintering. For example, many metals have melting points that are lower than the sintering temperatures of many ceramics. If a metal component is to be used in conjunction with the ceramic prior to sintering, the ceramic may be only partially sintered to prevent damage, form loss, vaporization, etc. of the metallic component. This may have undesirable effects on the ceramic component of the system. For example, partial sintering may result in a less favorable internal structure or grain formation, it may produce a ceramic that is less mechanically robust in bond or structure, it may result in less desirable electrical qualities, or it may otherwise reduce the service life or effectiveness of the system.

Alternatively, the ceramic may be fully sintered and the metallic component added after sintering is complete. In this case, additional measures must be taken to properly join any ceramic components as well as providing a good interface between ceramic components and the metallic components. In some instances, an additional firing process is used to bond the components. This can add cost, complexity, and negatively affect the overall structure.

SUMMARY

Embodiments of a method are described. In one embodiment, the method is a method for making a constraining ceramic assembly. The method includes applying at least one metallic electrode to a substrate. The method also includes applying a porous ceramic layer to the substrate to cover the metallic electrode. The method also includes sintering the substrate, the porous ceramic layer, and the metallic electrode together at a sintering temperature above a melting point of the metallic electrode. Other embodiments of the method are also described.

Embodiments of an apparatus are also described. In one embodiment, the apparatus includes a substrate, a porous ceramic layer, and a metallic electrode. The metallic electrode is substantially enclosed by the substrate and the porous ceramic layer. The substrate and the porous ceramic layer are sintered together with the metallic electrode enclosed. The metallic electrode has a melting point lower than a sintering temperature of the substrate and the porous ceramic layer. Other embodiments of the apparatus are also described.

Embodiments of a system are also described. In one embodiment, the system includes a sensor disposed in a gas environment. The sensor detects a gas or chemical concentration within the gas environment. The sensor includes a substrate, a porous ceramic layer, and a metallic electrode. The metallic electrode is disposed between the substrate and the porous ceramic layer. The metallic electrode is substantially enclosed by the substrate and the porous ceramic layer. The substrate and the porous ceramic layer are sintered together with the metallic electrode enclosed. The metallic electrode has a melting point lower than a sintering temperature of the substrate and the porous ceramic layer. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
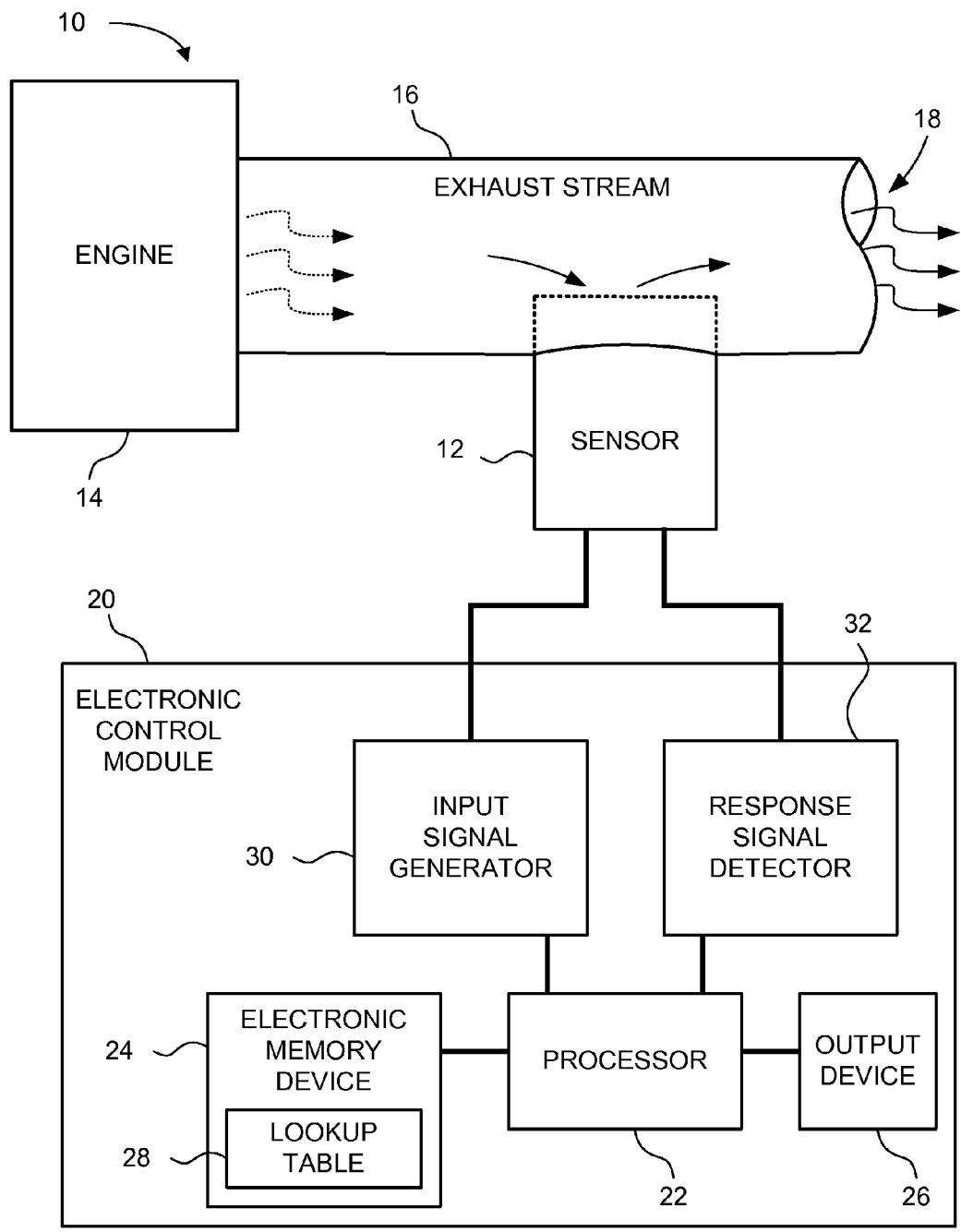
FIG. 1 depicts a schematic block diagram of one embodiment of a gas sensor system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to a product formed by constraining a lower melting point material within ceramic layers. In the course of investigating potential ceramic arrangements to avoid the need to use multiple firing steps or only partially sintering a ceramic, it was discovered that constraining a first material having a relatively low melting point would allow for full sintering of an enclosing material. Surprisingly, during the process of testing the constraining system, it was discovered that a porous material could be used to constrain the lower melting point material without loss of the lower melting point material through the pores of the porous material. Even though the pores of the porous material would seem to provide a pathway for the lower melting point material to volatize, escape the desired location, or otherwise degrade, the lower melting point material remains constrained. This discovery is beneficial to many industries and applications.

Further, the ability to constrain a lower melting point material during a process which exceeds the melting point of the lower melting point material allows for a reduction in the number of steps required to manufacture a ceramic with a material having a melting point below that of the ceramic sintering temperature. Additionally, the process results in a more stable and robust product. The resultant stability allows for sensors with higher sensitivity, improved signals, improved signal-noise ratios, improved mechanical strength and resilience, and a larger range of operating temperatures. One or more aspects of this discovery may impact many technologies at various levels. For example, this discovery may be useful in the manufacture of sensors and other electronics as well as composites for structural and mechanical applications.

FIG. 1 depicts a schematic block diagram of one embodiment of a gas sensor system 10. The illustrated sensor system 10 includes a sensor assembly 12, an engine 14, and an exhaust system 16. The engine 14 produces exhaust which moves through the exhaust system 16. The exhaust system 16 facilitates flow of the exhaust gases to a gas outlet 18, typically for emission into the atmosphere. The sensor assembly 12 is at least partially inserted into the exhaust system 16 to detect a parameter within the exhaust stream. As the gas in the exhaust system 16 passes over and/or through the sensor assembly 12, the sensor assembly 12 detects a condition within the exhaust by measuring chemicals or temperature or other parameters at the sensor assembly 12, as described herein. In one embodiment, the sensor 12 is a single cell sensor without a separate reference cell. A single cell arrangement may be beneficial in certain applications. For example, a single cell includes a pair of electrodes and an electrolyte. Such a single cell system might reduce the complexity and requirements of the system as well as reduce cost of materials and components. In another embodiment, the system 10 includes a reference cell (not shown) mounted outside of the exhaust stream. This may be beneficial in certain applications. For example, in some applications, this may allow the system 10 to achieve a higher degree of sensitivity with reduced margins of error. In a specific embodiment, the sensor assembly 12 includes a $NO_x$ sensor to detect conditions related to the presence of NO and/or $NO_2$ within the exhaust stream. However, other embodiments may be implemented to detect other chemicals or compositions within the exhaust stream.

The exhaust sensor system 10 also includes an electronic control module 20. The electronic control module 20 includes a processor 22, an electronic memory device 24, and an output device 26. In some embodiments, the electronic memory device 24 stores one or more references 28 and/or other data, as described herein. The electronic control module 20 also includes an original signal generator 30 and a response signal detector 32.

In further embodiments, the electronic control module 20 also may include a control circuit (not shown) to control some or all of the operations of the sensor assembly 12. Alternatively, some or all of the control circuit functionality may be implemented at the sensor assembly 12 or at another location that is not necessarily proximate the electronic control module 20. Additionally, in some embodiments, the control circuit may control a peripheral system (not shown). Some examples of peripheral systems that may be implemented at the sensor assembly 12 include, but are not limited to, a heater (not shown) or a chemical neutralizer system (not shown). Instead of or in addition to the chemical neutralizer system, some embodiments may include an emission control element (not shown) to neutralize other aspects of the chemicals and/or substances within the exhaust system, either upstream or downstream from the sensor assembly 10. In other embodiments, the control circuit may control peripheral systems at other locations within the exhaust sensor system 10.

In some embodiments, reference 28 is an algorithm into which data are entered by the processor to generate a value corresponding to some characteristic of the exhaust stream. In other embodiments, the reference 28 is a lookup table to correlate a sensor signal to a value for a characteristic of the exhaust stream. In some embodiments, the value corresponds to one or more concentrations of gases within the exhaust stream. In another embodiment, the value corresponds to a temperature of the exhaust stream. In other embodiments, the value corresponds to other characteristics of the exhaust stream.

In one embodiment, the sensor assembly 12 includes a solid-state electrochemical gas sensor (described with relation to FIGS. 2-5B). Other embodiments of the sensor assembly 12 may include different types of gas sensors.

The processor 22 communicates with the original signal generator 30 and the response signal detector 32. The processor 22 may identify differences and changes between the two signals and look up a reference difference in the lookup table 28 of the electronic memory device 24. The signal differences determined by the processor 22 correlate to a value contained or extrapolated from the lookup table 28.

Figure 2:
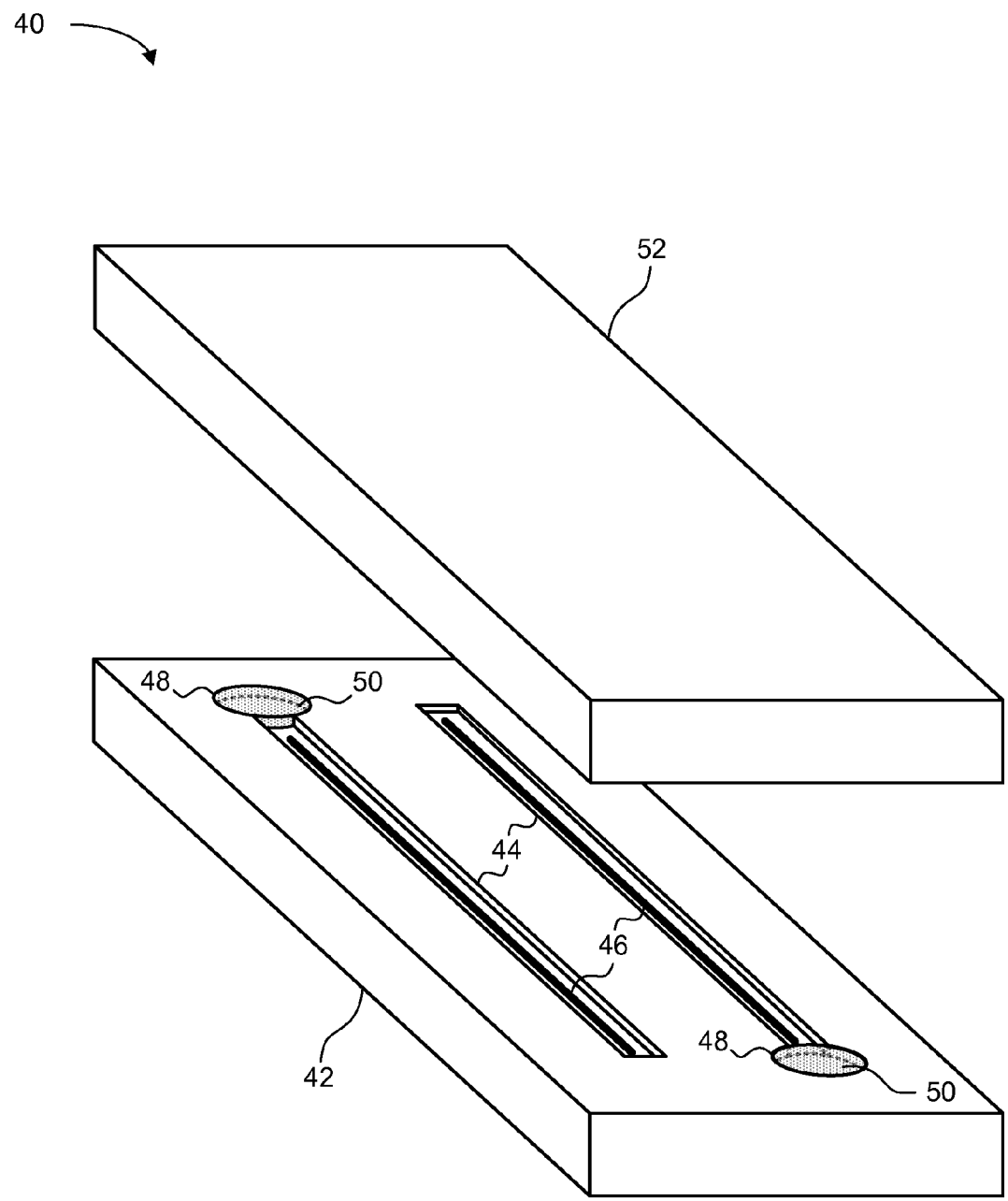
FIG. 2 depicts a schematic diagram of one embodiment of a constraining ceramic assembly prior to sintering.

FIG. 2 depicts a schematic diagram of one embodiment of a constraining ceramic assembly 40 prior to sintering. In the illustrated embodiment, the assembly 40 includes a substrate 42, and a porous layer 52. The substrate 42 may be formed of ceramic or other materials. In some embodiments, the substrate 42 includes one or more cavities 44. In some embodiments, the cavities 44 are a surface feature in the substrate 42 to allow one or more electrodes 46 to be placed into the substrate 42. In some embodiments, the cavities 44 are formed by a mechanical process such as molding, polishing, grinding, or cutting. In other embodiments, the cavities 44 are formed by a chemical process such as etching or solvent softening. In some embodiments, the cavities 44 are formed during the process of forming the substrate 42. In other embodiments, the cavities 44 are applied to the substrate 42 after the substrate 42 has been formed. For example, the cavities 44 may be formed in the substrate 42 before application of the electrodes 46 or they may be formed by pressing the electrodes 46 into the substrate 42. The cavities 44 may be uniform along their length or variable. In some embodiments, the cavities 44 have a substantially rectilinear cross section. In other embodiments, the cavities 44 have a curved or non-linear cross section. In the illustrated embodiment, the cavities 44 are parallel. In other embodiments, the cavities may be oriented in a non-parallel relative orientation. In the illustrated embodiment, the cavities 44 are linear along their lengths. In some embodiments, the cavities 44 may have a curved length. The cavities 44 may have similar or dissimilar geometries relative to one another.

The illustrated embodiment of the cavities 44 also includes fugitive regions 48. In some embodiments, the fugitive regions 48 are joined with the cavities 44. In some embodiments, the fugitive regions 48 facilitate addition of a fugitive material 50. The fugitive regions 48 may be circular, as illustrated, or some other geometry. The fugitive regions 48 may have the same depth as the cavities 44 or a different depth. In some embodiments, the fugitive regions 48 allow for accommodation of the electrodes 46 during sintering. This is due to shrinkage of the substrate and porous layer 52. In some embodiments, the fugitive regions 48 may allow the electrodes 46 to form a contact pad, via, or other electrical feature or component.

In some embodiments, the fugitive material 50 is volatized during the sintering process. In other embodiments, the fugitive material 50 may dissociate, diffuse into, or bond with the ceramic, or simply shrink to occupy less of the fugitive region 48. In some embodiments, the fugitive material 50 leaves the fugitive region 48 vacant for the electrodes 46 to flow into the fugitive region 48 as the electrodes 46 melt and the surrounding material undergoes shrinkage. The fugitive material 50 may be carbon or another material. In some embodiments, the fugitive material 50 may be a solid, liquid, or gas. In some embodiments, the fugitive material 50 provides structural support to prevent the porous layer 52 from sagging or falling into the fugitive regions 48 prior to completion of the sintering process. In some embodiments, the fugitive material 50 may produce a chemical or mechanical change on the material surrounding the fugitive region 48 or provide some other functionality. For example, the fugitive material 50 may soften or harden the surrounding area, it may color the area to act as an indicator during a material removal process, it may affect the electrical nature of the surrounding material, or it may affect the flow rate, structure, pattern, or adhesion of the electrode 46 in the fugitive region 48. The fugitive material 50 may have other effects before, during, or after sintering.

The illustrated embodiment also includes the porous layer 52. In some embodiments, the porous layer 52 is a layer of porous ceramic. The porous layer 52 may be made of a ceramic that is porous prior to sintering or a ceramic that becomes porous through the manufacturing process. In some embodiments, the porosity of the porous layer 52 is less than 25%. For example, the porosity may be 0.5%, 14%, or 16%. In some embodiments, approximate porosity measurements indicate a variation of 1%-5%. In other embodiments, approximate porosity measurements indicate a potential variation of more than 5%. In other embodiments, the porosity of the porous layer 52 is 25% or higher. The porous layer 52 constrains the electrodes 46 during the sintering process. The porous layer 52 may include one or more of a variety of ceramics. For example, any of the variants of stabilized zirconias such as yttria-stabilized zirconia, calcia-stabilized zirconia, scandia-stabilized zirconia, magnesia-stabilized zirconia, and ceria-stabilized zirconia. The porous layer 52 may also include other ceramic ionic conductors like gadolinia-doped ceria; perovskite materials (i.e., strontium titanate and strontium stannate); and other ceramic electrolyte materials. Additionally, materials generally classified as "low temperature" co-fired ceramics or glass-ceramic such as alumina, AlN, BN, SiC, and BeO may be incorporated. Other embodiments may include other materials.

The porous layer 52 may be uniform in thickness or have a variable thickness. In some embodiments, the porous layer 52 is made using a ceramic tape. The porous layer 52 may be formed to match the substrate 42 or it may have a unique profile. In some embodiments, the porous layer 52 may include surface features or treatments to provide some functionality either internally or in interaction with external components or environments. For example, the porous layer 52 may include a structural region to reduce or prevent sagging of the porous layer 52 into the cavities 44 or other features of the substrate 42.

The porous layer 52 is applied to the substrate 42. In some embodiments, the porous layer 52 may be joined to the substrate 42 through chemical and/or mechanical processes or applications prior to sintering. For example, the porous layer 52 and the substrate 42 may be isostatically pressed, uniaxially pressed, chemically softened through use of a solvent, chemically bonded, or thermally treated. In some embodiments, the assembly 40 is then sintered at a sintering temperature of the ceramic components. In some embodiments, the sintering temperature ranges from approximately 1400° C. to 1550° C. In other embodiments, the sintering temperature ranges from 1000° C. to 1700° C. Other embodiments may sinter within other ranges of temperatures which may be lower and/or higher than the examples given above.

Figure 3:
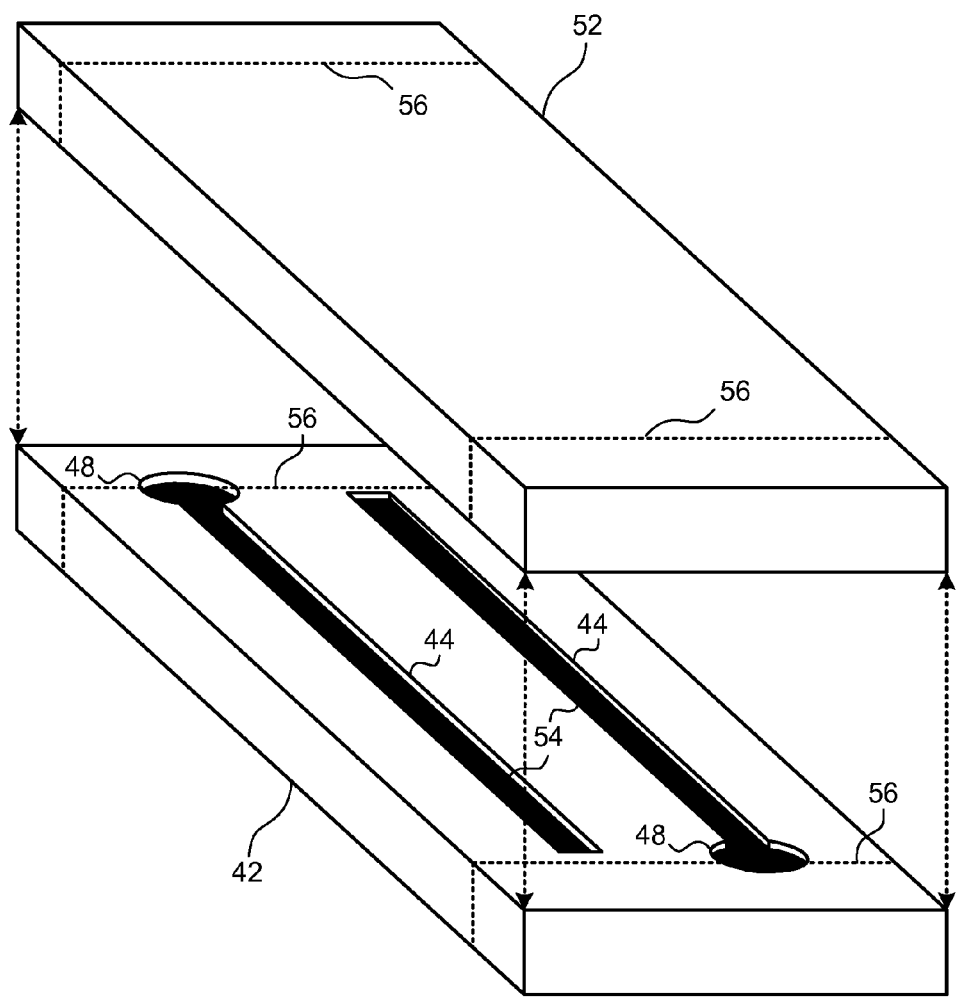
FIG. 3 depicts an exploded view of a schematic diagram of one embodiment of a constraining ceramic assembly after sintering.

FIG. 3 depicts an exploded view of a schematic diagram of one embodiment of a constraining ceramic assembly 40 after sintering. In the illustrated embodiment, the electrodes 46 of FIG. 2 have melted during the sintering process and filled the cavities 44. Because the porous layer 52 encloses the electrodes 46 of FIG. 2 with the substrate 42, the electrodes 46 cannot flow out of the assembly 40 or leave the cavities 44 and fugitive regions 48. It was discovered that the porous layer 52 may be quite porous while retaining the ability to constrain the melted electrodes 54 within the assembly 40 during sintering. Additionally, the sintering process has expended the fugitive material 50 of FIG. 2 to leave the fugitive regions 48 empty to allow the melted electrodes 54 to move into the fugitive regions 48. With the porous layer 52 fully sintered to the substrate 42, the electrode material 54, even in liquid form, remains constrained between the porous layer 52 and the substrate 42. In some embodiments, the melted electrode 54 fills a portion of the cavities 44 and the fugitive region 48. In other embodiments, the melted electrode 54 completely fills the cavities 44 and the fugitive region 48.

In some embodiments, the assembly 40 may be cut or polished to expose a portion of one or more of the electrodes 54. For example, the assembly 40 may be removed at approximately the threshold 56. This may be accomplished by polishing, etching, or other mechanical or chemical methods of removing the material. In some embodiments, both the substrate 42 and the porous layer 52 may have material removed after sintering. In other embodiments, only one of the substrate 42 and the porous layer 52 has material removed. In some embodiments, the material of the substrate 42 or the porous layer 52 has material removed to expose an electrical connection to the electrodes 54. In other embodiments, the material is removed to add another component to the assembly 40. For example, the material of the porous layer 52 may be removed up to the threshold 56 to expose the portion of the electrode 54 within the fugitive region 48. This may provide a contact pad, test connection, or otherwise facilitate an electrical connection or other interface or function. For example, some embodiment may facilitate a testing connection or provide a connection point or access for external components.

Figure 4A:
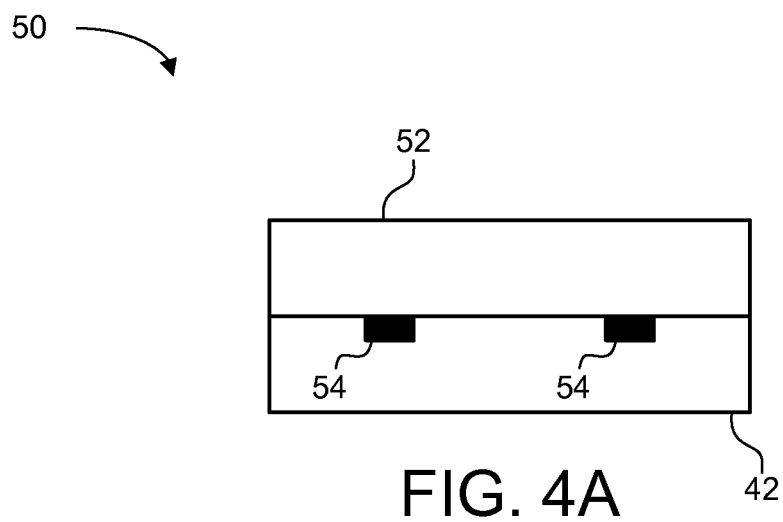
FIG. 4A depicts a cross-sectional view of one embodiment of a constraining ceramic assembly.

FIG. 4A depicts a cross-sectional view 50 of one embodiment of a constraining ceramic assembly. In the illustrated embodiment, the electrodes 54 are set within the substrate 42. In the illustrated embodiment, the cross section of the electrodes 54 is rectangular. In other embodiments, the cross section of the electrodes 54 may be non-rectangular, wholly or partially rounded, or any another geometry. The cross section of the electrodes 54 may vary over the length of the electrode 54. In some embodiments, the electrodes 54 may be unique relative to one another. In other embodiments, the electrodes 54 may be identical. In the illustrated embodiment, the electrodes 54 are recessed into the substrate 42. In other embodiments, the electrodes 54 may be set into the porous layer 52. In another embodiment, the electrodes 54 may be set partially into both the substrate 42 and the porous layer 52.

Figure 4B:
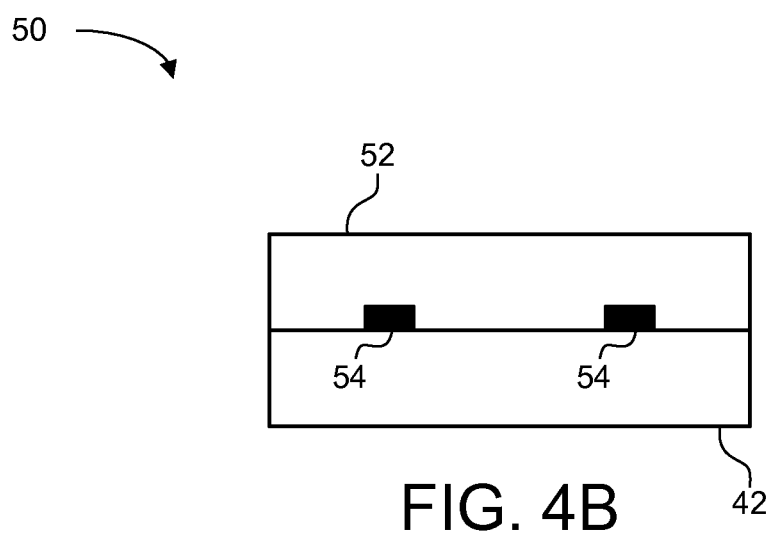
FIG. 4B depicts a cross-sectional view of another embodiment of a constraining ceramic assembly.

FIG. 4B depicts a cross-sectional view 50 of another embodiment of a constraining ceramic assembly. In the illustrated embodiment, the electrodes 54 are recessed into the porous layer 52. In some embodiments, the electrodes 54 may be aligned with a channel or cavity within the porous layer 52. In another embodiment, the electrodes 54 may be recessed into the porous layer 52 when the porous layer 52 is pressed onto the substrate 42. Other methods of recessing the electrodes 54 within the porous layer 52 may be implemented.

Figure 4C:
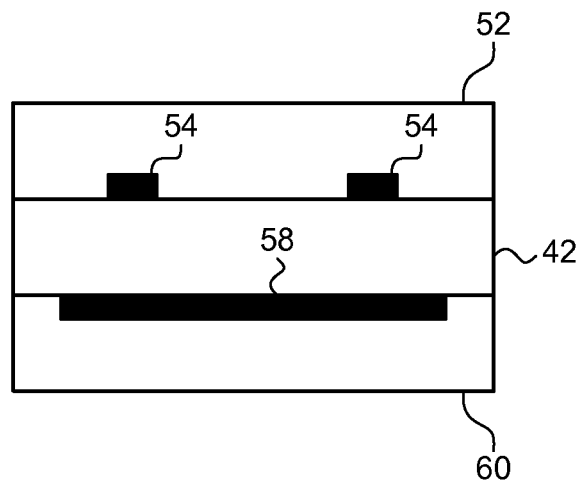
FIG. 4C depicts a cross-sectional view of another embodiment of a constraining ceramic assembly with a heater.

FIG. 4C depicts a cross-sectional view 50 of another embodiment of a constraining ceramic assembly with a heater 58. In the illustrated embodiment, the heater 58 is applied to a heater substrate 60. The heater 58 and heater substrate 60 are applied to the substrate 42. In some embodiments, the heater 58 may be applied directly to or within the substrate 42. In some embodiments, the heater substrate 60 may be omitted. In some embodiments, voltage is applied to the heater 58 to produce heat. In some embodiments, the heater 58 is used to maintain the assembly at or near an operating temperature. In other embodiments, the heater 58 applies heat in a start-up, burn-off, or purging stage. Other embodiments may incorporate fewer or more components to provide less or more functionality.

Figure 4D:
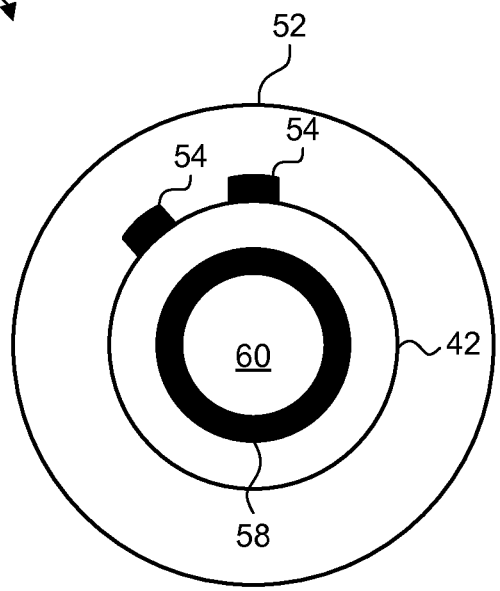
FIG. 4D depicts a cross-sectional view of a non-planar embodiment of a constraining ceramic assembly with a heater.

FIG. 4D depicts a cross-sectional view 50 of a non-planar embodiment of a constraining ceramic assembly with a heater 58. The illustrate embodiment includes a heater substrate 60 surrounded by a heater 58. The substrate 42 and the porous layer 52 substantially constrain the electrodes 54. In this embodiment, the assembly is cylindrical. In some embodiments, the cross section may be non-circular. In the illustrated embodiment, two electrodes 54 are included. There may be additional electrodes 54 around the perimeter of the substrate 42. In some embodiments, additional electrodes 54 may facilitate particular sensing schemes or provide other benefits.

The orientation may also be reversed so that the porous layer 52 is the innermost layer with the heater 58 and/or heater substrate 60 as the outermost components. In some embodiments, the center of the cross section 50 may be hollow or open to the environment. The cross section may include additional features to allow the environment to pass through the porous layer 52 to the electrodes 54. These features may include channels, ports, or cutaways to access the porous layer 52. Other features or structures that improve flow or environmental exposure of the electrodes 54 may be included.

Figure 5A:
FIG. 5A depicts a graph of sensor response to variable gas concentrations.
Figure 5A:
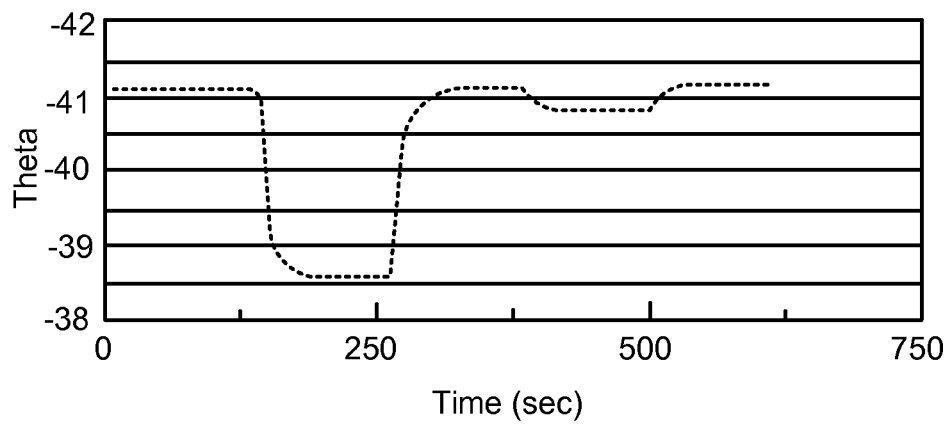

FIG. 5A depicts a graph 60 of sensor response to variable gas concentrations. The graph 60 shows an electrical phase angle response to an alternating signal of an electrochemical impedance-based sensor incorporating the constrained electrode design described above. The porous layer 52 allows gas to permeate and interface with the electrodes 54. These embodiments exhibited a response to variations in NO concentrations in a gas. The graph shows the response for a 100 ppm concentration of NO and a 10 ppm concentration of NO. The graph also depicts the response time and time to return to normal. This graph illustrates the behavior of one embodiment in specific conditions. For example, this specific test environment was maintained at 724° C. and a constant background oxygen concentration of 10.5%. Other embodiments may produce similar or different behavior in similar or different environments or variables.

Figure 5B:
FIG. 5B depicts another graph of sensor response to variable gas concentrations.
Figure 5B:
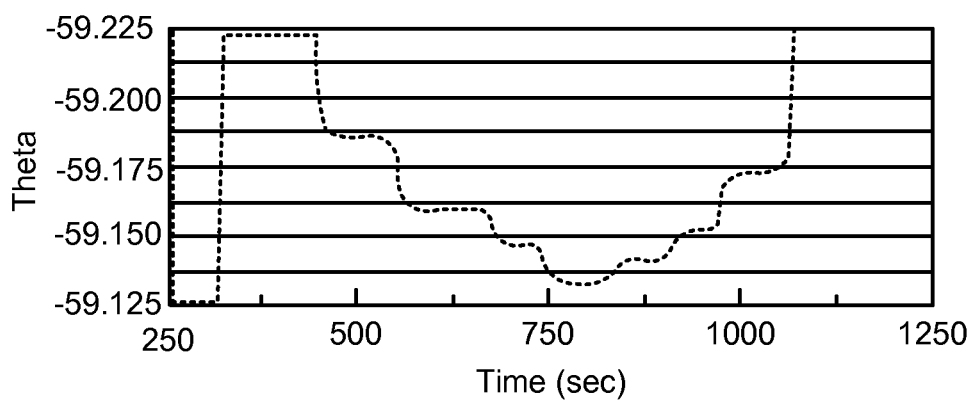

FIG. 5B depicts another graph 70 of sensor response to variable gas concentrations. The graph 70 shows a response to variations of NO in a gas environment. The depicted output of the sensor occurred in response to NO steps of 1 ppm and 0.5 ppm at 650° C. The steps shown are at 10, 11, 11.5, 12, 11.5, 11, and 10 ppm NO. The sensitivity of the sensor at such fine increments may provide utility across a wide range of applications.

Figure 6:
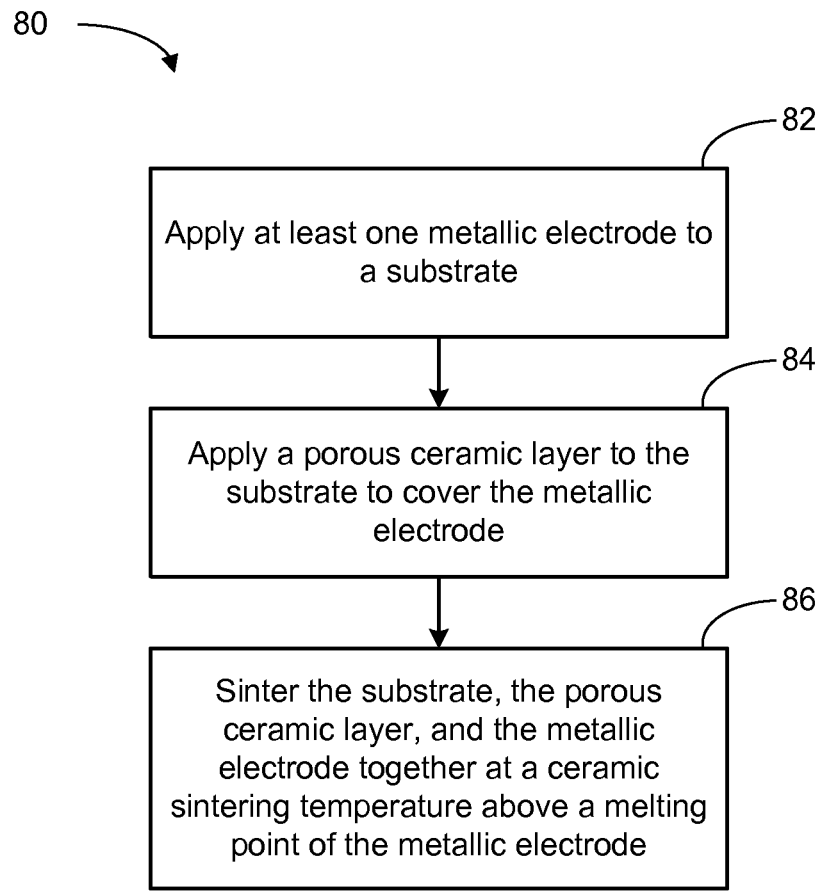
FIG. 6 depicts a flowchart diagram of one embodiment of a method for making a constraining ceramic assembly.

FIG. 6 depicts a flowchart diagram of one embodiment of a method 80 for making a constraining ceramic assembly. Although the method 80 is described in conjunction with the constraining ceramic assembly 40 of FIG. 3, embodiments of the method 80 may be implemented with other types of constrained ceramic assemblies.

At block 82, at least one metallic electrode is applied to the substrate. In other embodiments, at least one metallic electrode may be applied to another component of the assembly, such as the porous ceramic layer. At block 84, the porous ceramic layer is applied to the substrate to cover the metallic electrode. At block 86, the substrate, the porous ceramic layer, and the metallic electrode are sintered together at a ceramic sintering temperature above a melting point of the metallic electrode.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A method of making a constraining ceramic assembly, the method comprising:
    forming a cavity in a substrate to facilitate flow of at least one metallic electrode during a sintering process;
    applying the at least one metallic electrode to the substrate;
    applying a porous ceramic layer to the substrate to cover the at least one metallic electrode; and
    sintering the substrate, the porous ceramic layer, and the at least one metallic electrode together at a sintering temperature above a melting point of the metallic electrode.

2. The method of claim 1, further comprising placing a fugitive material into the cavity, wherein the fugitive material is expended during sintering.

3. The method of claim 1, wherein the cavity is formed to allow the flow of the at least one metallic electrode to form an electrical via.

4. The method of claim 1, wherein the cavity is formed to allow the flow of the at least one metallic electrode to form a contact pad.

5. The method of claim 1, wherein the porous ceramic layer has a porosity up to approximately 25%.

6. The method of claim 1, wherein the sintering temperature is between 1000° C. and 1700° C.

7. An apparatus comprising:
    a substrate;
    a porous ceramic layer; and
    a metallic electrode disposed between the substrate and the porous ceramic layer, wherein the metallic electrode is enclosed by the substrate and the porous ceramic layer; and wherein the substrate and the porous ceramic layer are sintered together with the metallic electrode enclosed, wherein the metallic electrode has a melting point lower than a sintering temperature of the substrate or the porous ceramic layer, wherein the apparatus further comprises a cavity to facilitate flow of the metallic electrode during sintering.

8. The apparatus of claim 7, wherein the substrate comprises a porous ceramic.

9. The apparatus of claim 7, wherein the metallic electrode comprises a metal having a melting point below a sintering temperature of the substrate and the porous ceramic layer.

10. The apparatus of claim 9, wherein the metallic electrode comprises gold.

11. The apparatus of claim 7, wherein at least one of the substrate and the porous ceramic layer comprises stabilized zirconia.

12. The apparatus of claim 7, wherein the electrode comprises a metallic ribbon.

13. A system comprising:
    a sensor disposed in a gas environment, wherein the sensor is configured to detect a concentration within the gas environment, the sensor comprising:
        a substrate;
        a porous ceramic layer; and
        a metallic electrode disposed between the substrate and the porous ceramic layer, wherein the metallic electrode is enclosed by the substrate and the porous ceramic layer; and wherein the substrate and the porous ceramic layer are sintered together with the metallic electrode enclosed, wherein the metallic electrode has a melting point lower than a sintering temperature of the substrate and the porous ceramic layer, wherein the sensor further comprises a cavity to facilitate flow of the metallic electrode during sintering.

14. The system of claim 13, wherein the substrate comprises a porous ceramic.

15. The system of claim 13, wherein the electrode comprises gold.

16. The system of claim 13, wherein the sensor has a planar geometry.

17. The system of claim 13, wherein the sensor has a non-planar geometry.

18. The system of claim 13, further comprising a heater to apply heat to the sensor.

* * * * *